United States Patent
Namikata

(10) Patent No.: US 7,777,906 B2
(45) Date of Patent: Aug. 17, 2010

(54) DOCUMENT MANAGEMENT SYSTEM, DOCUMENT MANAGEMENT METHOD, AND PROGRAM

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1125 days.

(21) Appl. No.: 11/392,782

(22) Filed: Mar. 30, 2006

(65) Prior Publication Data
US 2006/0224939 A1  Oct. 5, 2006

(30) Foreign Application Priority Data
Apr. 1, 2005  (JP) .............................. 2005-106789

(51) Int. Cl.
*G06F 15/00* (2006.01)
*G06K 1/00* (2006.01)

(52) U.S. Cl. ............... 358/1.15; 358/1.13; 358/1.14; 358/1.9

(58) Field of Classification Search ............... 358/1.9, 358/1.12–1.18, 2.1; 703/6; 715/202; 382/162; 710/15, 38
See application file for complete search history.

(56) References Cited

U.S. PATENT DOCUMENTS

| | | | |
|---|---|---|---|
| 6,563,944 B1 * | 5/2003 | Kumada | 382/162 |
| 6,609,162 B1 * | 8/2003 | Shimizu et al. | 710/15 |
| 6,738,151 B1 * | 5/2004 | Kato | 358/1.12 |
| 6,947,959 B1 * | 9/2005 | Gill | 715/202 |
| 7,124,212 B2 * | 10/2006 | Shimizu et al. | 710/38 |
| 7,209,262 B2 * | 4/2007 | Komatsu | 358/2.1 |
| 7,216,070 B2 * | 5/2007 | Kitada et al. | 703/6 |
| 7,545,527 B2 * | 6/2009 | Matsuhara et al. | 358/1.15 |
| 2003/0208644 A1 * | 11/2003 | Shimizu et al. | 710/15 |
| 2005/0190388 A1 * | 9/2005 | Kawakami et al. | 358/1.9 |
| 2005/0275862 A1 | 12/2005 | Matsumoto et al. | 358/1.13 |
| 2005/0275881 A1 | 12/2005 | Akashi et al. | 358/1.15 |
| 2005/0275882 A1 | 12/2005 | Yasuda et al. | 358/1.15 |
| 2005/0275883 A1 | 12/2005 | Kobayashi et al. | 358/1.15 |
| 2005/0275884 A1 | 12/2005 | Matsukubo et al. | 358/1.15 |
| 2005/0289215 A1 | 12/2005 | Namikata et al. | 709/200 |
| 2006/0028678 A1 | 2/2006 | Negishi et al. | 358/1.15 |

FOREIGN PATENT DOCUMENTS

| | | |
|---|---|---|
| JP | 2002-328795 | 11/2002 |
| JP | 2003-99299 | 4/2003 |
| JP | 2003-524836 | 8/2003 |
| JP | 2004-302741 | 10/2004 |
| JP | 2005-078284 | 3/2005 |

OTHER PUBLICATIONS

Japanese Office Action dated Dec. 22, 2009 concerning JP Application No. 2005-106789.

* cited by examiner

*Primary Examiner*—Chan S Park
*Assistant Examiner*—Satwant K Singh
(74) *Attorney, Agent, or Firm*—Fitzpatrick, Cella, Harper & Scinto

(57) ABSTRACT

To obtain the same print result from MFPs with different specifications. When it is instructed to store image data read by a scanner of an MFP of a plurality of MFPs which forms the grid computing system, resources of an MFP converts a format of image data into a common format according to device profile information of the MFP and the image data whose format is converted is stored in a storage area shared in the system.

9 Claims, 16 Drawing Sheets

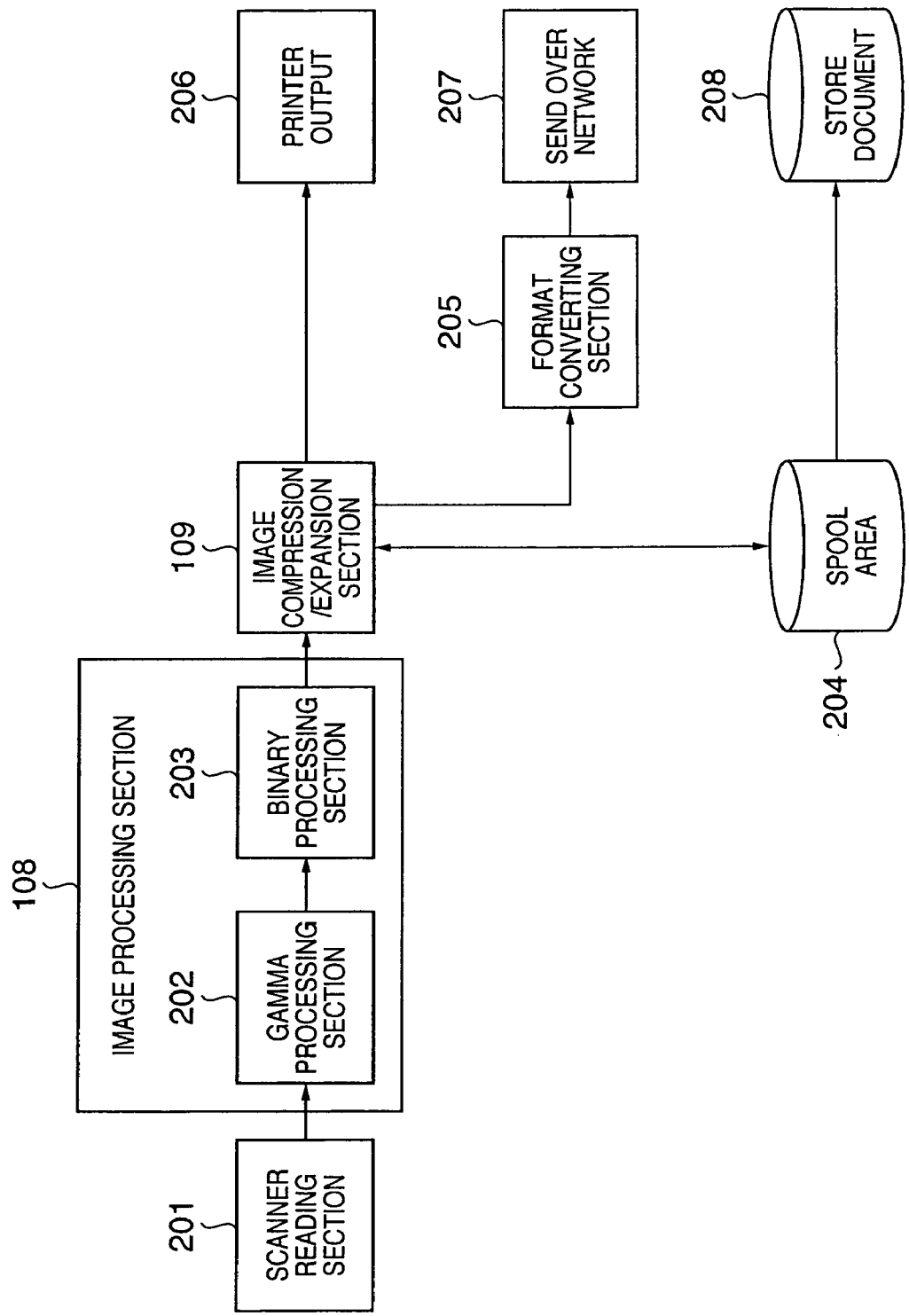

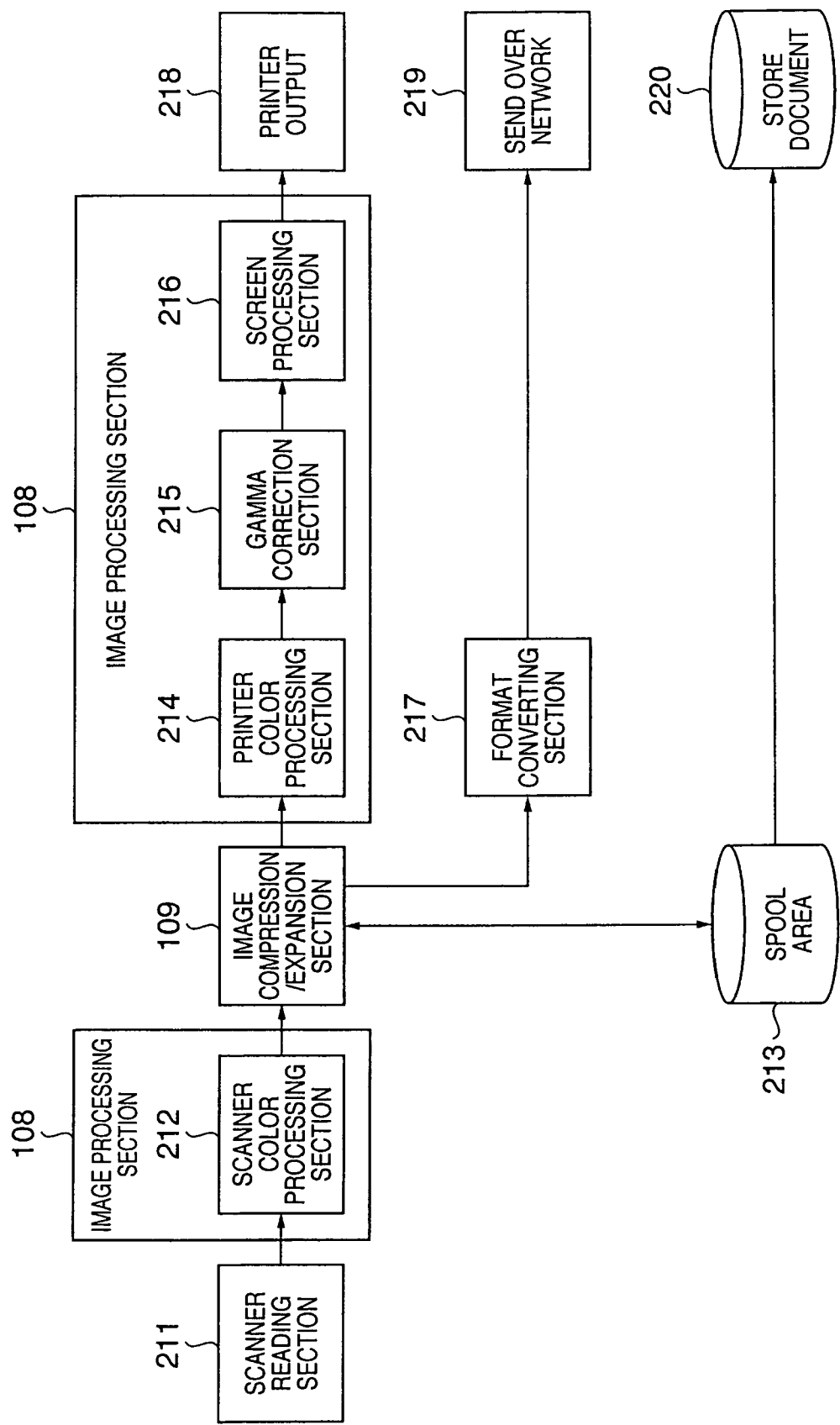

FIG. 5
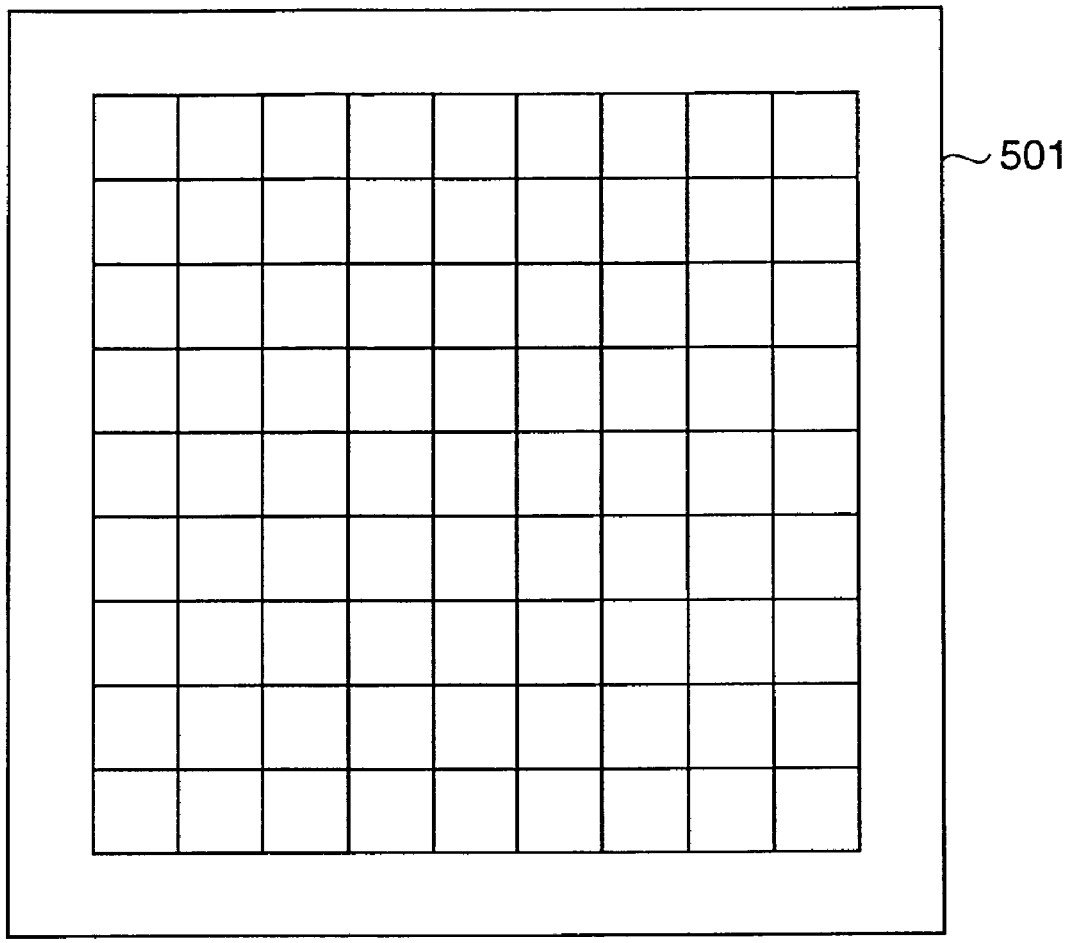
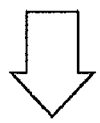 COLOR MEASUREMENT ~502
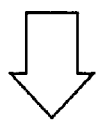 Lab DATA ~503
501

DOCUMENT MANAGEMENT SYSTEM, DOCUMENT MANAGEMENT METHOD, AND PROGRAM

FIELD OF THE INVENTION

The present invention relates to a document management system and a document management method. More specifically, the present invention relates to a document management system, a document management method and program which can perform load distribution processing by using a grid computing technique that processes image data obtained by reading a document by a scanner or the like and digitizing using a plurality of image processing apparatuses connected with each other via a network.

BACKGROUND OF THE INVENTION

As office equipment, a Multi Functional Printer (hereinafter referred to as MFP) having a copy function, a printer function and a facsimile function has been widely used.

The MFP realizes the copy function by performing image processing on image data read by scanner and outputting the result to a printer. In addition, the MFP realizes the printer function by receiving print data generated at a host side, rendering the print data, performing image processing on the print data and outputting the result to the printer.

The recent MFPs have a scanner function which uses a network as an I/F to transfer image data read by a scanner section via a network to a host, in addition to the functions mentioned above. A MFP having an HDD inside has a function for storing scanned image data in an HDD (hereinafter referred to as a document storing function) and is widely used for digitizing a document or the like on paper media.

<Arrangement of MFP>

Functions of each MFP including a document storing function will be described with reference to drawings. FIG. 1 is a block diagram showing an arrangement of an MFP.

A CPU (Central Processing Unit) 101 operates according to a program stored in ROM 102 and controls each section via an internal bus 113. A network I/F 106 is connected with the other devices on the network. In printing operation, the network I/F 106 controls process including a print request from a client PC on the network, outputting the print data, a data storage, and receiving the data to be stored. In scanning operation, the network I/F 106 controls for sending image data scanned by an MFP to a client PC on the network.

RAM 107 temporarily stores image data to be printed or scanned image data. In addition, the RAM 107 is a memory that functions as a main storage apparatus for storing program data of an executable program executed on the CPU 101 or an intermediate code or intermediate data whose program is being executed. ROM 102 is a read only memory for storing a control program for controlling over a device including an initial control such as booting of the MFP.

An HDD 104 is a sub storage apparatus for storing an execution program stored in the RAM 107, image data to be printed, and scanned image data for a short period or a long period by control of the CPU 101.

An operating section 103 has inputting means such as operation buttons and/or a touch panel corresponding to the operation intended by a user to operate the MFP. The operating section 103 has display means for displaying progress of internal processing or an internal status of the MFP and communicates user's operation to the CPU 101.

A scanner control section 105 and a printer control section 110 are control sections for driving and controlling a scanner 111, a printer 112, and image data transfer, respectively. The scanner 111 applies light on a manuscript placed on a manuscript glass platform from a light source and converts the reflected light into photoelectric by a photo acceptance unit to convert it into electronic image data.

In this description, a color type MFP and a monochrome type MFP are described by the same block diagrams. The scanner 111 in the color MFP is, however, adapted to generate image signals of RGB three channels and send them to the scanner control section 105 by using a CCD with three RGB color filters. The scanner 111 in the monochrome MFP is adapted to generate image signals of one channel and send it to the scanner control section 105 by using a CCD with a filter having a spectral sensitivity to a medium wavelength range.

The printer 112 includes a printer mechanism section for outputting a final printed output image. An electrophotographic printer converts image signals into laser modulation signals, applies light on a photosensitive drum, and develops toner on the photosensitive drum. And, this developed toner is transferred to a recording medium, and after the transferred toner is fixed, the recording medium is outputted as a print image. The printer 112 also has different configurations in the monochrome MFP and the color MFP. In the monochrome MFP, the printer 112 has only a developing section for a color of Bk (black). In the color printer, however, the printer 112 usually has a developing section for four colors of C (cyan), M (magenta), Y (yellow) and K (black), and prints an image by using toner of four colors of CMYK.

Usually, the printer 112 allows tone expressions by N bits for each pixel. Therefore, image data to be printed is represented by half tone for N bits in each color at an image processing section 108. The image processing section 108 also has functions of gamma correction processing and color converting processing. Each function of the image processing section 108 is realized by LSI.

An image compression/expansion section 109 is used for reducing data capacity when it temporarily stores scanned image data and/or image data to be printed. The monochrome MFP uses the JBIG compression technology appropriate for binary images. The color MFP uses the JPEG compression technology appropriate for color multilevel image.

<Function and Operational Flow of MFP>

A copy function, a scanner function via a network, and a document storage function in an MFP with the arrangement mentioned above and a processing flow of each function will be described below.

First, a processing function of the monochrome MFP will be described with reference to FIG. 2A.

The scanner 111 reads image data at a scanner reading section 201. A gamma processing section 202 and a binary processing section 203 mounted on the image processing section 108 are performed on image data read at the scanner reading section 201. The resulted data is JBIG compressed at the image compressing/expansion section 109 and is temporarily stored in a spool area 204 on the HDD 104. The monochrome MFP usually has resolution of 600 dpi or 1200 dpi and read image data is considered as 8 bit signals. The gamma processing section 202 corrects the image so that the print has the same density as the manuscript by considering device characteristic of the scanner 111 and a device characteristic of the printer 112. Then, the binary processing section 203 performs binary processing to output the image to the printer 112.

Binary image data is spooled here so that operation of each of a copy function, a scanner function, a document storage function, a facsimile function and a print function does not intervene the other functions when the functions are executed simultaneously. That enables copy operation to be performed during a waiting time of printing operation.

A processing flow until compression/expansion and spooling of image data is the same as above. Operation of each function starts from expanding the spooled compressed image data.

In copy operation, image data expanded at the image compression/expansion section 109 is sent as it is to the printer 112 to be outputted by the printer output section 206. With a scanner function, the expanded image data is converted into a data format which can be easily treated by the PC at a format converting section 205 and sent over a network via a network I/F 106 at a network transmitting section 207.

With a document storing function, spooled image data is stored as document data as it is in another area 208 of the HDD 104. The stored document data can be retrieved and reprinted or sent over a network in response to a user's instruction. In such a case, the image data stored in the spool area 204 is returned and the operation which is the same as the above-mentioned functions is performed.

As document data to be stored is spooled compressed image data, the document data is advantageous in that it can be reprinted or sent easily.

A processing flow of the color MFP will be described with reference to FIG. 2B.

The color MFP is different from the monochrome MFP in that the signals read and obtained by the scanner 111 are color signals. The color scanner usually has resolution around 600 dpi in consideration of the size of image data. The color scanner reads by 8 bits signals for each color of RGB.

The image data read at a scanner reading section 211 is converted from color spaces depending on a scanner device into standard color spaces at a scanner color processing section 212 that is mounted on the image processing section 108. That can be done only by processing such as well-known masking processing or three dimension look up table interpolation.

The 8-bit image data for each color of RGB after color conversion at the scanner color processing section 212 is JPEG compressed at the image compression/expansion section 109 and spooled in a spool area 213 as in the case of monochrome MFP.

The color MFP converts image data expanded at the image compression/expression section 109 from RGB to CMYK at a printer color processing section 214 mounted on the image processing section 108 in copy operation. After subjected to gamma correction at a gamma correction section 215 which includes calibration of tone characteristic of the printer, the image data is converted into half-tone image data with the number of bits (for example, two bits) which can be treated by the printer at a screen processing section 216 and sent to the printer 112 and outputted from a printer output 218.

With a scanner function, expanded image data is converted in format at a format converting section 217 as in the case of the monochrome MFP and sent over a network at a network transmitting section 219.

For a document storing function, image data of the spool area 213 is stored in a document storing area 220 as document data as in the monochrome MFP. Document data stored by the document storing function is reused in the same operation as in the monochrome MFP.

If a document on storage media such as a sheet of paper or the like is converted into electronic image data and stored in an MFP with a storage function mentioned above, a manuscript on sheets of paper can be obtained by reprinting and/or the manuscript can be delivered by image data with the storage function mentioned above.

<Grid Computing Technique>

On the other hand, parallel distributed processing computing techniques including the PC clustering technique or the grid computing technique have been developed.

The grid computing technique is a technique for facilitating a client on a network to equivalently access various resources of each processing node placed on a network, i.e., calculation resources in a CPU or memory, or storage resources such as an HDD.

[Patent Document 1] Japanese Patent Laid-Open No. 2003-099299

[Patent Document 2] National Publication of International Patent Application No. 2003-524836

SUMMARY OF THE INVENTION

FIG. 3 is a diagram for illustrating an architecture where a grid computing system applied to an MFP system.

In FIG. 3, a Client 301 operates as a software program incorporated in the MFP on a network and a user adds a task (print, scan job and the like) as a request to the client MFP 301. The added task is passed onto a Task Manager (hereinafter referred to as TM) 302 operating on a grid server. The TM 302 conveys the contents to a Dynamic Job Scheduler (hereinafter referred to as DJS) 303 also operating on a server.

The DJS 303 manages resources of whole of a plurality of MFPs 310, 320 and 330 which respectively include Brokers 311, 321 and 331 and Resource Manager (hereinafter referred to as RM) 312, 322 and 332 and function as processing nodes. Then, the DJS 303 analyzes a task (job), selects a Broker of optimum resources and informs TM 302 of that. The term "resources" here means an empty state of a CPU which is available to an MFP or an empty capacity of an HDD.

The Broker operates on an MFP (which may be the same MFP as or a different MFP from the client 301) on a network. The Broker registers information on resources collected by an RM which operates on each MFP also as a processing node to the DJS 303. The Broker adds a job to optimum resources in response to a request from the TM 302 and performs completion notification to the TM 302 at the completion of the processing on the job.

The TM 302 adds a job to an optimum Broker selected by the DJS 303, monitors progress of the job thereafter, and when it receives completion notification from the Broker, notifies the client 301 of the result. If resources change or encounter abnormal conditions (for example, if resources have a failure or accept another job), the RM notifies a corresponding Broker of that.

The grid computing system is realized with the system mentioned above distributing a job among resources such as a CPU, which is usually not used, and enabling distribution processing among a plurality of devices transparently to a user.

Although a client and each processing node are described as MFPs in the description above, they may be usual PCs. With software architecture of the grid computing technique, equivalent access to resources is realized even among different models or platforms.

By applying the grid computing technique to the MFP in such a manner, a storage function of the MFP described above can be improved. That is to say, it is easy for the other MFPs to access data stored in individual MFPs on a network. In addition, if an HDD of each MFP cannot store new data, the data can be stored in an HDD in another MFP or another PC.

Access equivalent to access to the memory of own device to document data stored in a plurality of MFPs on a network by using a grid computing technique entails the following problem: the form of the data to be stored depends on the specifications of each MFP. For example, different data forms are mixed according to differences in color/monochrome, resolution, number of bits, device characteristic.

In such a case, if a user prints image data scanned with an MFP by another MFP with specifications different from that of the first MFP, the print result different from the case where the image data is scanned and printed by the same MFP or the user cannot have prints outputted due to difference of forms.

In view of the conditions mentioned above, the present invention intends to obtain the same print result even from an image processing apparatus with different specifications in an image processing system that stores image data by using the grid computing technique.

A document management system as an aspect of the present invention for achieving the object above is a document management system in which a computer apparatus and a plurality of image processing apparatuses are connected with each other via a network for enabling load distribution processing, wherein each of the plurality of image processing apparatuses include:

a scanner adapted to read a manuscript and to convert into image data;

a printer adapted to print image data;

storage means adapted to store image data; and a CPU adapted to execute a program;

wherein the computer apparatus includes:

storage means adapted to store device profile information and various types of data on specifications of each image processing apparatus;

a CPU adapted to execute a program;

a management module adapted to manage each predetermined storage area in storage means of the plurality of image processing apparatuses and the computer apparatus, and a status of a CPU of each of the plurality of image processing apparatuses and the computer apparatus;

an image conversion module adapted to convert a format of image data according to the device profile information; and an instruction module adapted to instruct at least a CPU of the plurality of image processing apparatuses and the computer apparatus to execute the image conversion module;

wherein, when the management module is instructed to store image data read by a scanner of the plurality of image processing apparatuses, the management module instructs the at least a CPU to execute the image conversion module with the instruction module, converts the format of the image data and stores the image data in any of predetermined storage areas managed by the management module.

With such a configuration, even if image processing apparatuses with different specifications are mixed in a system, a format of image data to be stored in a storage area shared in the system can be a desired format. When image data is reused for printing or the like, the image data can be printed with the same quality as that from each image processing apparatus.

The management module converts image data into a predetermined format, for example, a common format by using the instruction module and any of the plurality of image processing apparatuses instructs the image data to be printed, the management module may cause the at least a CPU to execute the image conversion module with the instruction module so as to convert the predetermined format of the image data into a format complying with specifications of the image processing apparatus which is instructed to print the image data, and converts the format of the image data to cause a printer of the image processing apparatus which is instructed to print the image data to print the image data.

Alternatively, the management module may make the instruction module to cause the at least a CPU to execute the image conversion module so as to convert a format of the image data into a plurality of formats complying with specifications of respective image processing apparatuses.

The management module may preferentially use a computer apparatus to execute an image conversion module and store image data which is converted in format.

The computer apparatus may further include profile calculating means for calculating the device profile information on each image processing apparatus based on image data of a manuscript with predetermined patterns printed at each image processing apparatus read by the scanner.

Each image processing apparatus may include a user interface for a user to designate which of the predetermined storage areas managed by the management module should store image data read by the scanner when the user instructs to store the image data.

The device profile information may include at least any of scanner's reading resolution, the printer's printing resolution, information on whether it is monochrome or color, and information on color spaces to be used.

A document management method as another aspect of the present invention for achieving the object above is a document management method where a computer apparatus and a plurality of image processing apparatuses are connected with each other via a network for enabling load distributed processing, wherein each of the plurality of image processing apparatuses includes:

a scanner for reading a manuscript and converting it into image data;

a printer for printing image data;

storage means for storing image data; and a CPU for executing a program;

wherein the computer apparatus includes:

storage means for storing device profile information and various type of data on specification of each image processing apparatus;

a CPU for executing a program; and the storage area in each storage means of the plurality of image processing apparatuses and the computer apparatus;

wherein the method includes:

a management step adapted to manage a status of a CPU in each of the plurality of image processing apparatuses and the computer apparatus;

an image converting step adapted to convert a format of image data by at least a CPU of the plurality of image processing apparatuses and the computer apparatus according to the device profile information when it is instructed to store image data read by scanner of the plurality of image processing apparatus; and a storing step adapted to store the image data converted in format in any of the storage areas which are managed at the management step.

The object mentioned above is also achieved by an image processing system including:

registration means adapted to register device profile information on an image processing apparatus to participate when the image processing apparatus participates in a grid computing system consisting of a plurality of image processing apparatuses; and converting means adapted to convert image data of the inputted image into a predetermined format according to device profile information on an image processing apparatus in which an image is inputted and specifications of the image processing apparatus.

The object mentioned above is also achieved by a computer program which instructs an information processing apparatus to execute the document management method mentioned above, and a storage medium for storing the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2A is a diagram showing an example of a processing flow of a monochrome MFP;

FIG. 2B is a diagram showing an example of a processing flow of a color MFP;

FIG. 5 is a diagram showing an example of a patch image read when a device participates in the grid computing system of FIG. 4 and the processing;

DETAILED DESCRIPTION OF THE PREFERRED EMBODIMENTS

Preferred embodiments of the present invention will be described in detail as examples below with reference to attached drawings. The components described in the embodiments below are merely an example and is not intended to limit a range of the present invention.

First Embodiment

A preferred embodiment of the present invention will be described below with reference to drawings.

This embodiment is adapted as a grid computing system for distributing and storing a document by using the MFP as mentioned above in BACKGROUND OF THE INVENTION and the grid computing technique.

Figure 1:
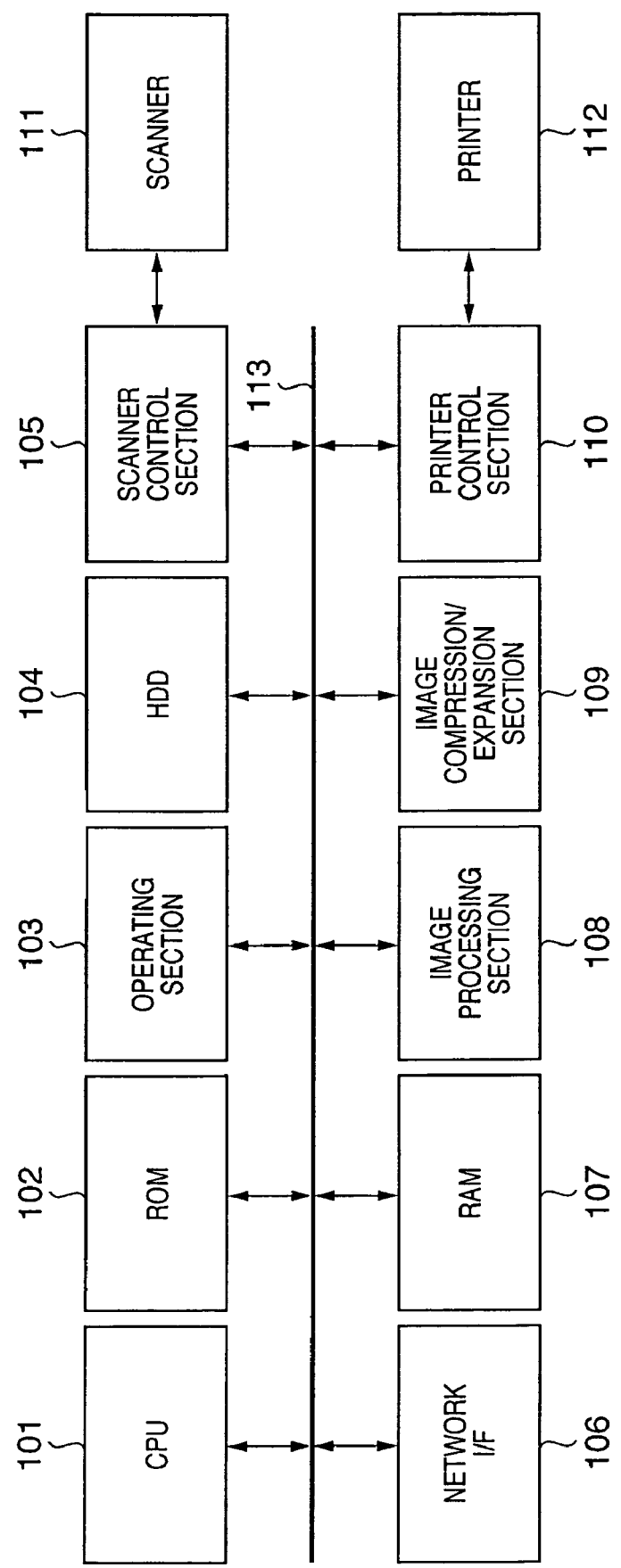
FIG. 1 is a block diagram showing an arrangement of an MFP.
Figure 3:
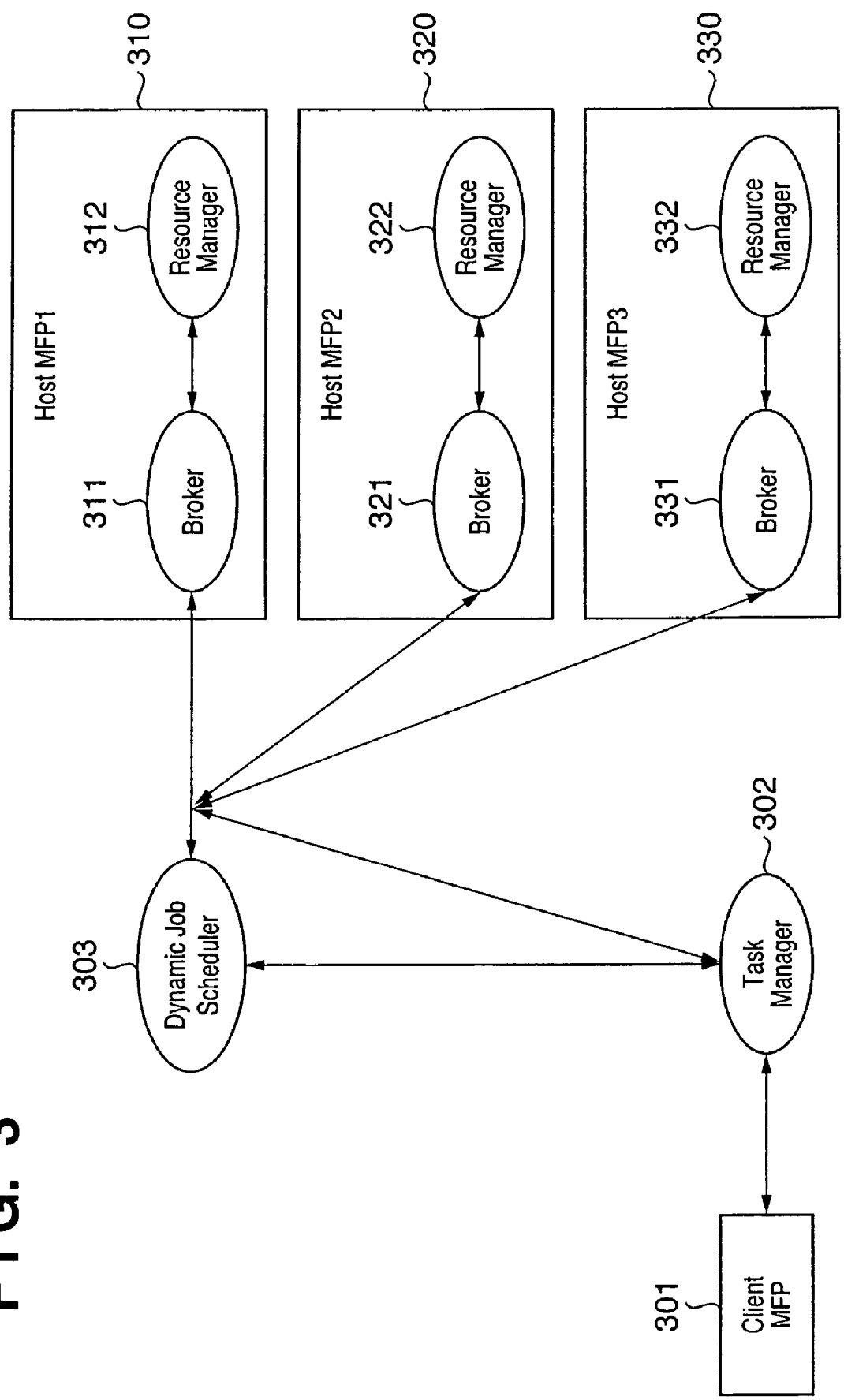
FIG. 3 is a diagram showing an architecture of a general grid computing system.
Figure 4:
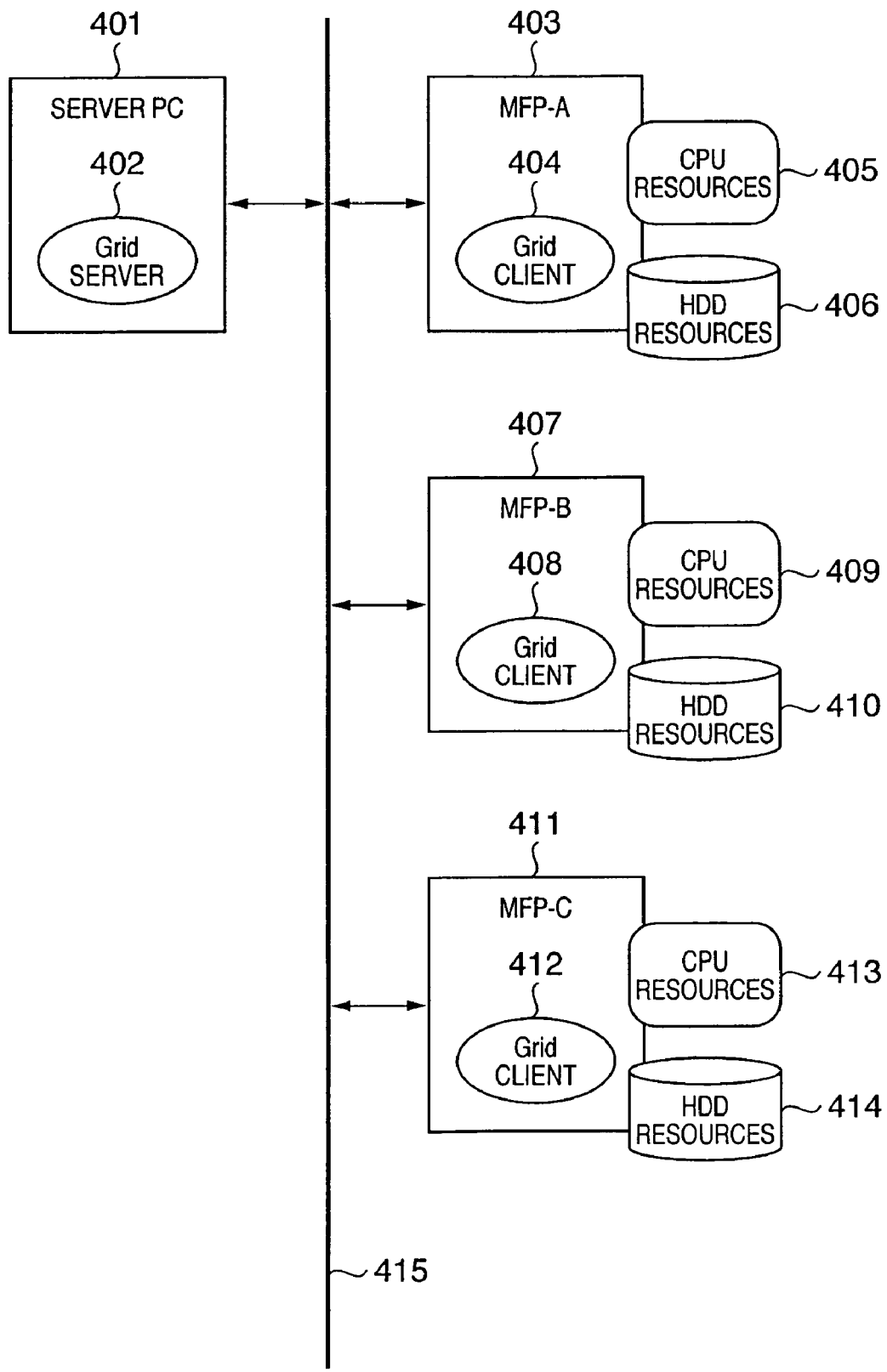
FIG. 4 is a block diagram showing an example of a grid computing system configuration of the first embodiment of the present invention.

FIG. 4 is a diagram showing an example of a system configuration of this embodiment.

In a server PC 401, a Grid server 402 operates as a software program for collectively realizing functions of DJS and TM, which are server software programs of the grid computing system. This server PC 401, MFP-A 403, MFP-B 407, MFP-C 411 are connected with a network 415. Each of the MFPs has a document storing function and has HDD resources 406, 410 and 414 for storing a document. CPU resources 405, 409 and 413 of the MFPs are also used for operating a Grid client 404, which is a software program for realizing a Broker or an RM.

The MFP-A 403 stores image data of a document which is read and scanned with monochrome binary in resolution of 1200 dpi as document data. The MFP-B 407 stores image data of a document which is read and scanned with monochrome binary in resolution of 600 dpi as document data. The MFP-C 411 stores image data of a document which is read and scanned with 8 bit for each color of RGB colors in resolution of 600 dpi.

The DJS manages HDD resources allocated for distribution sharing at each MFP as a distributed shared document storage area of each MFP and also manages CPU resources of each MFP in order to perform image converting job to be described later. Management information for that purpose is obtained through an RM and a Broker which are operating in each MFP.

When each of MFP-A, MFP-B and MFP-C participates in the grid computing system of this embodiment, it registers characteristic (specifications) of image data read and obtained by each MFP to the Grid server 402. For that purpose, each MFP has a patch print as shown FIG. 5 as a standard print common in the grid computing system and performs operation of analyzing image data obtained by reading the patch print.

The patch print 501 shown in FIG. 5 is color patches including arbitrary color patches and tones printed on it. The patch prints are previously measured by color measuring equipment 502 and Lab data 503 is obtained and saved at the grid server 402 side.

Figure 6:
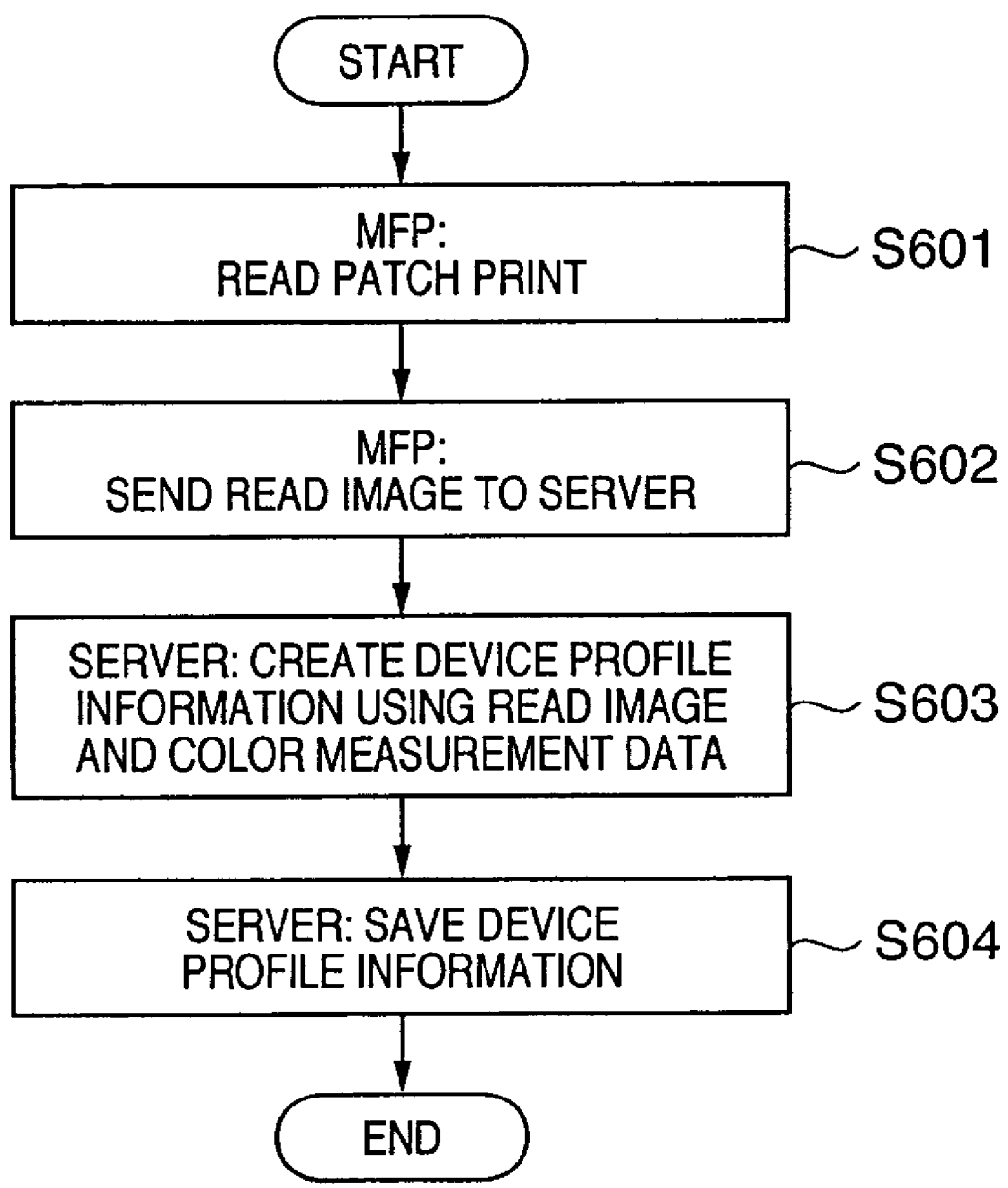
FIG. 6 is a diagram showing a flowchart of process for obtaining characteristic of scan image data performed in each MFP when it participates in the grid computing system of FIG. 4.

FIG. 6 shows an example of a flowchart of process for obtaining characteristic of scan image data performed in each of MFP-A, MFP-B and MFP-C when it participates in the grid computing system.

At S601, each MFP also reads the above-described patch print. At S602, the image data obtained by reading is sent to the grid server 402. At S603, the server 402 obtains a read value of an image of the MFP which read a patch print from the sent image data. Then, association between the read value and the above-described previously obtained measured color value is taken and device profile information is created. At S604, the device profile information is stored. This processing is performed on each of MFP-A, MFP-B and MFP-C.

Only needed to obtain a read value from the patch image at S603, a patch part of image data is detected so that an average value of the detected patch part is calculated.

Figure 7:
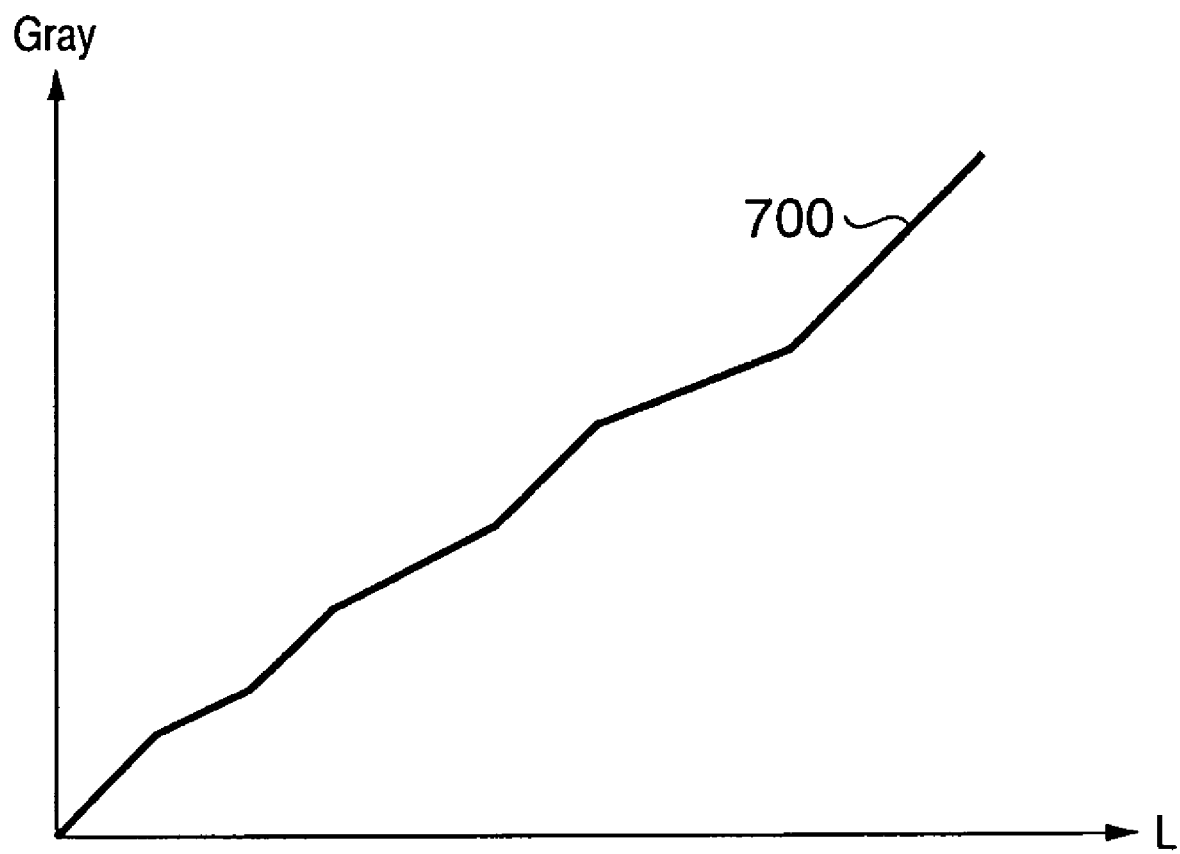
FIG. 7 is a graph schematically showing relationship between the read value of a patch and the color measured value.

The graph in FIG. 7 schematically shows relationship between the read value of a patch obtained in this manner and the color measured value. This graph represents a case of a monochrome MFP with a read value of a monochrome image Gray as ordinate and L (lightness) for representing brightness by Lab color space as abscissa. By using this relationship, a one-dimensional LUT (Look Up Table) to the Gray and a one-dimensional LUT from the Gray are obtained and stored as a part of device profile information.

Although a case of a monochrome MFP is described in FIG. 7, relationship between read RGB signals and Lab measured color values can be obtained in the case of a color MFP. From this relationship, a three-dimensional LUT from RGB to Lab and a three-dimensional LUT from Lab to RGB can be obtained. As such calculations of LUTs do not characterize the present invention, they are not detailed here, but many existing techniques can be used for the calculation.

In device profile information, not only an LUT for representing reading characteristic obtained in the manner described above but also information on resolution and the number of bits of image are stored.

The information can be obtained as information from each MFP. As the size of a patch print is previously known, the resolution can be calculated from the read image. The number of bits of each image data (pixel) can also be detected from values of image data. That is to say, if pixel values include only 0 or 1, the image is known to be a binary image. If pixel values include values sequentially from 0 to 255, the image is known to be an 8 bit image. Therefore, if information cannot be obtained from an MFP, that causes no problem.

Figure 8:
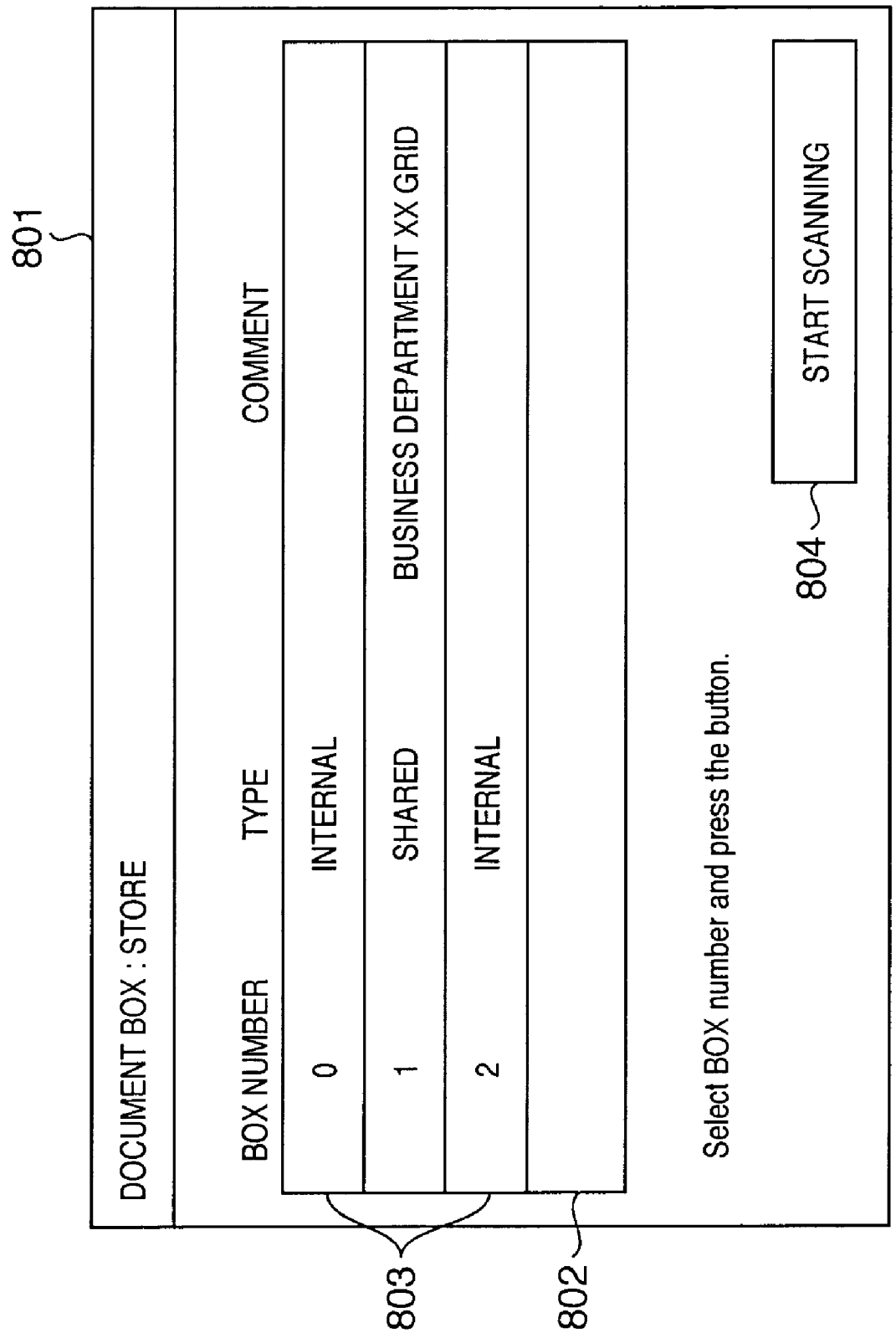
FIG. 8 is a diagram showing an example of a UI screen displayed on an operating section of each MFP.
Figure 9:
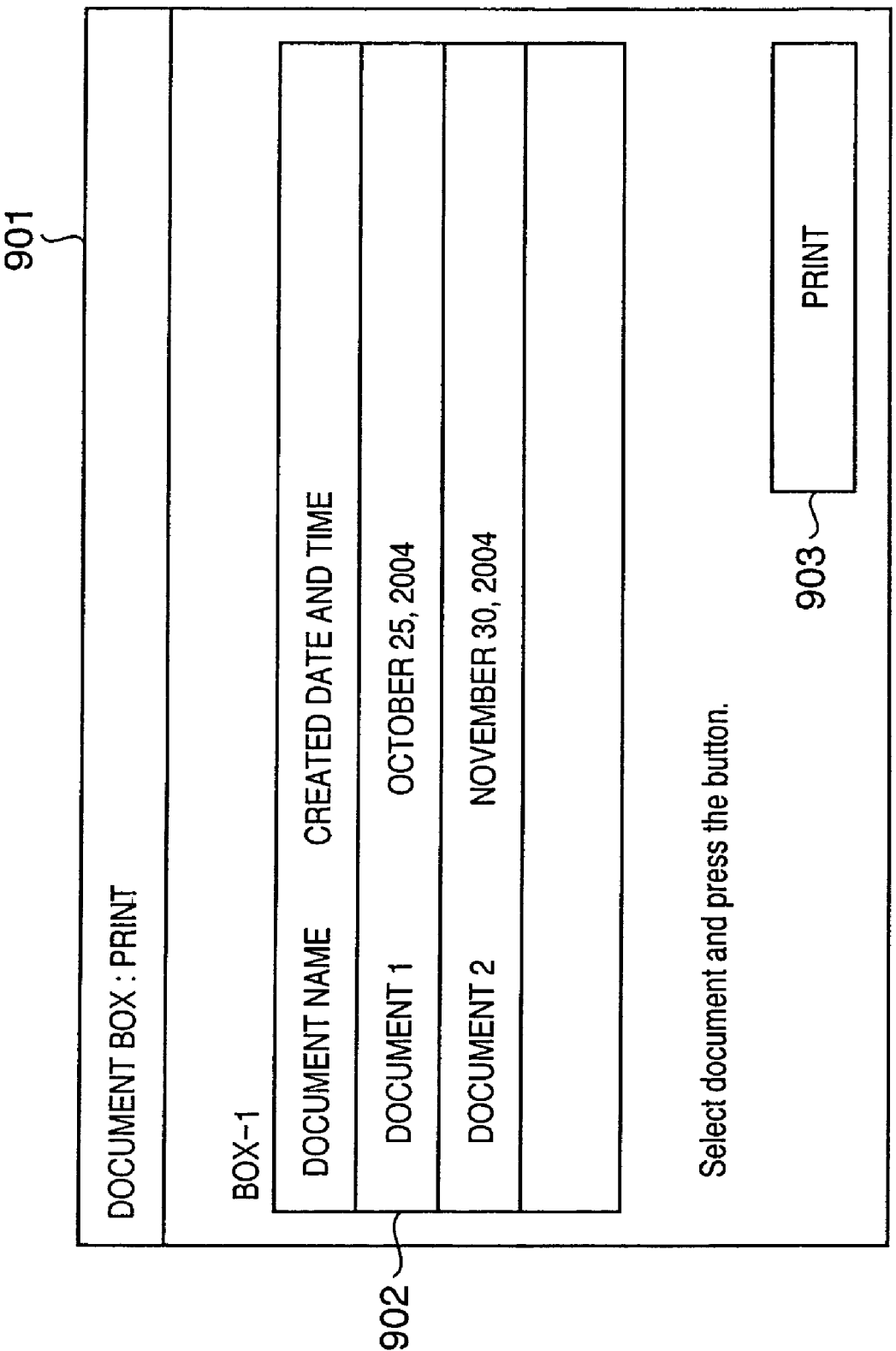
FIG. 9 is a diagram showing an example of a UI screen displayed on an operating section of each MFP.

FIGS. 8 and 9 are diagrams showing examples of UI (user interface) screens displayed on the operating section 103 of each MFP in the grid computing system of this embodiment.

FIG. 8 shows an example of a UI screen for storing a document in the grid computing system. This UI screen 801 is displayed on monitoring means having a touch panel function on the operating section 103 of the each MFP. When the displayed button is pressed down, an item is selected and/or an operation starts.

In the UI screen 801 at storing, a storing area is expressed by BOX, each of which is allocated with a number (0-2). The UI screen 801 displays the number and the type of the BOX and a comment. Types of BOX include "shared" and "internal". The number 1 BOX denoted by the numeral 802 is BOX distributed and shared in the grid computing system with "shared" displayed as the type, which indicates that the BOX can be shared in the system. For the numbers 0 and 2 BOXes denoted by the numeral 803, the types are shown as "internal", which indicates that each MFP is a storage area which is locally used and a storage area which is not shared.

In order to store a document, a user selects the number of BOX and presses a scan start button 804, and document storing operation starts.

FIG. 9 is a diagram showing an example of a UI screen when a document is retrieved from a storage area of the grid computing system and printed. In this UI screen 901, a list of document data in the BOX is displayed when the number of BOX 1 is selected. When a user selects a targeted document 902 and presses a print button 903, reprinting operation of the document starts.

In a conventional processing flow of storing a document mentioned above with reference to FIGS. 2A and 2B, pieces of image data temporarily stored in the spool areas 204 and 213 are stored as they are in the document storage area 220. In the grid computing system of this embodiment, however, the spooled image is temporarily passed to the grid server 402. That is for storing the image data in an MFP whose HDD resources are empty and for the purpose of image converting process to be described later.

Figure 10:
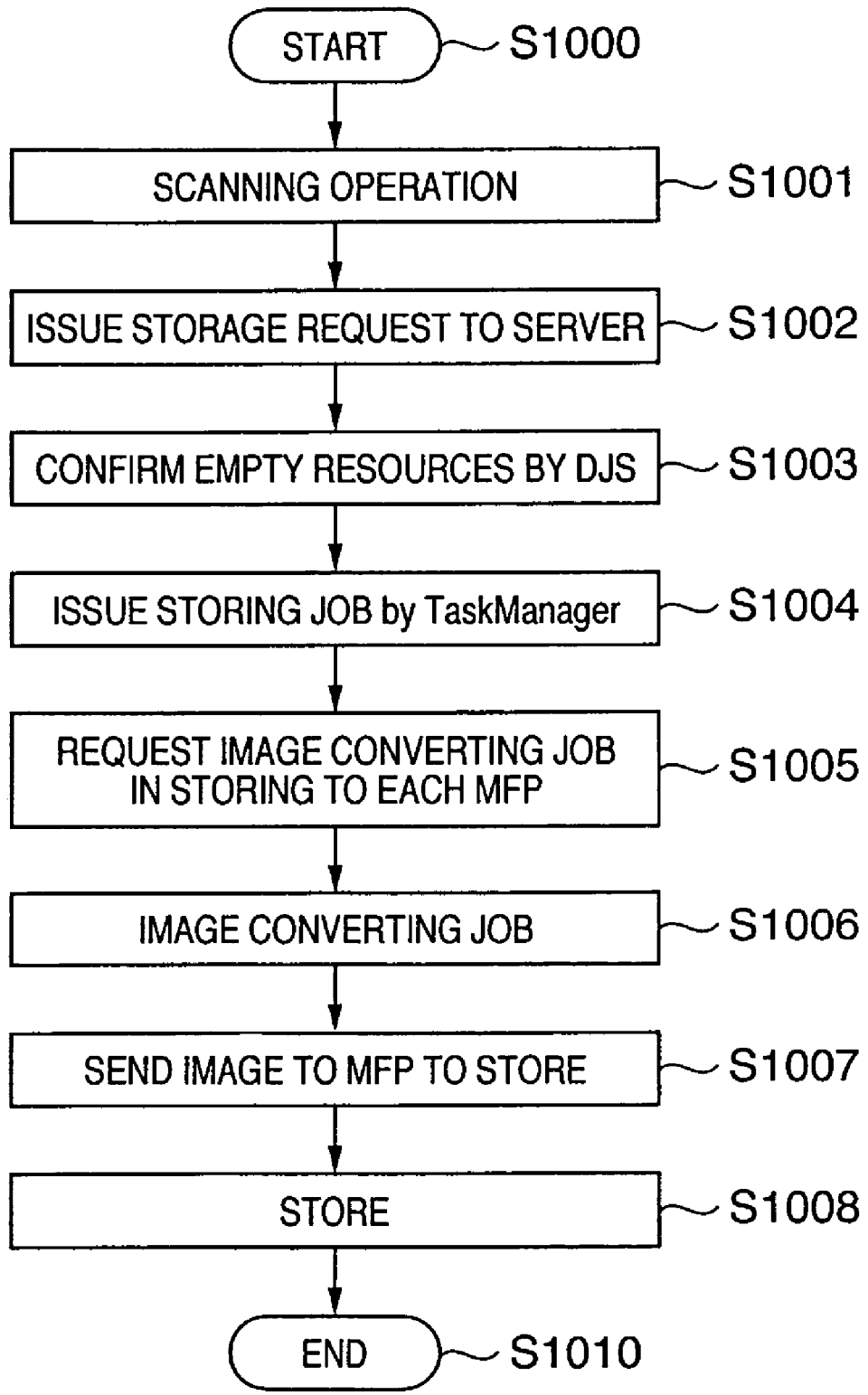
FIG. 10 is a flowchart showing process in storing a document in the distributed shared document storage area in the first embodiment.

FIG. 10 shows an exemplary flowchart of process of storing a document in the distributed shared document storage area in this embodiment. Here, a case where a user instructs to store a document in a MFP will be described.

When the scan start button 804 is pressed on the UI screen 801 shown in FIG. 8, the process starts at S1000. At S1001, the process until storing the scanned image in the spool area is performed according to the processing flow shown in FIG. 2 in the MFP which starts scanning. At S1002, a storage request is issued to the server 402 with an image stored in the spool area.

The server 402 which received the request examines a status of emptiness of HDD resources of each MFP by DJS at S1003 and determines the MFP to store the document. The server 402 also examines a status of emptiness of CPU resources of each MFP, determines the MFP to perform an image converting job to be described later and issues a storing job in a TM at S1004.

In such a case, if resources of the MFP which started scanning at S1001 are empty, the HDD resources of the MFP can be set to be used as a storage area preferentially.

The MFP to perform the image converting job as described below may be a single or plural. If a plurality of MFPs performs the job, the DJS divides image data and schedules each MFP.

At S1005, the TM requests an image converting job from each MFP according to job scheduling set by the DJS. The TM determines the selection of which MFP the TM requests an image converting job for from a result of what information on operation states of said plurality of MFPs a DJS obtains from each MFP. That is to say, when the TM requests a job to an MFP, MFPs processing the other jobs at the moment are removed from objects to be requested. It is a matter of course that if the CPU of the MFP is determined to have an enough capacity and determined by the DJS to be able to process the requested job while processing the other jobs, that MFP can be designated as the object to be requested. When the TM requests a job, it sends an image divided for performing distribution processing in each MFP, a processing module program and device profile information in a set to the MFP which is the object to be requested.

The MFP received the request performs the image converting job according to the request at S1006. At S1007, the MFP received the request sends converted image data to one of the MFPs to store the data. At S1008, the MFP received the request stores the image in a storage area and terminates the process at S1010.

Next, an image converting process performed in this embodiment will be described in detail.

This embodiment converts image data depending on characteristic of each MFP into a common color space, a common number of bits and common resolution and performs image converting process so as to store converted image data in an distributed shared document storage area. Therefore, image converting process to be performed differs according to specifications of the MFP which scanned the image (color/monochrome, resolution or the like).

Figure 11:
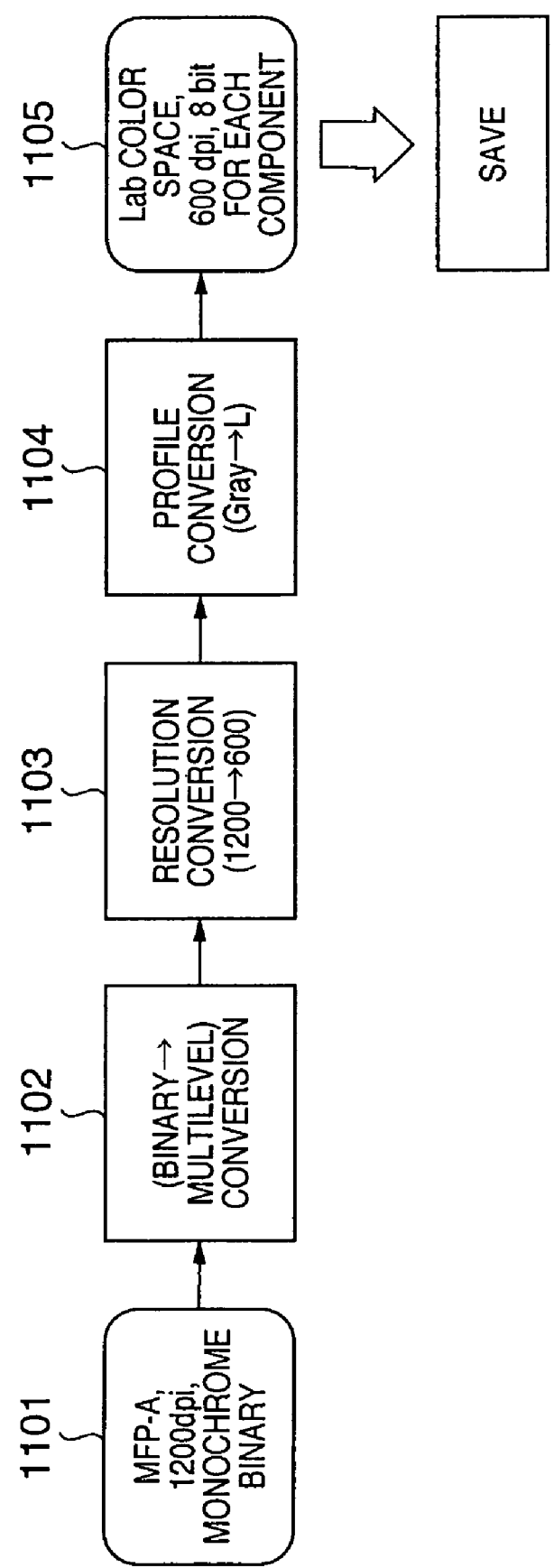
FIG. 11 is a diagram showing a flow of image converting process when image data scanned by the MFP-A is stored.

FIG. 11 shows a flow of image converting process when image data scanned at MFP-A 403 is stored.

In a typical document storing function, the monochrome MFP-A 403 which reads an image of monochrome binary at resolution of 1200 dpi stores image data scanned by specifications shown by 1101. In the grid computing system of this embodiment, however, binary are converted into multilevel at 1102 and resolution is converted into 600 dpi at 1103. Further, profile conversion from Gray to L (Lightness) is performed at 1104, then converted into image data of a common format is performed at 1105 and stored.

In this embodiment, as a common format of image data, Lab color space, which is a device-independent color space, is used and format of resolution 600 dpi and 8 bit for each color is set (a single channel for monochrome and RGB three channels for color). It is a matter of course that the common format is not limited to the exemplified format and the resolution may be 1200 dpi. As many color spaces can be used as a color space independent of a device in addition to the Lab color space, one of the color spaces may be used. In order to obtain a high quality print image, a format as effective as possible, i.e., a format without any information loss is preferably selected.

The DJS which receives the image data extracts differences between a common format and a format of the received image data. As the received image data is binary data in the example of FIG. 11, the DJS determines to use a conversion module from binary to multilevel. The DJS further determines to use a resolution conversion module to absorb differences of resolution to smooth out discrepancy of resolutions and specifies X dpi and Y dpi as a parameter of the resolution conversion module. The DJS further retrieves a one-dimensional LUT from Gray to L from previously created device profile information of MFP-A 403 and determines to use an interpolation module which performs an LUT calculation. Then, the DJS creates an image converting job which makes information about the modules and parameters downloaded to each MFP of the grid computing system and causes the modules to be performed.

The created image converting job is sent to the corresponding MFP, which is a processing node of the grid computing system, with image data divided as required as mentioned above.

As the modules for performing each process of 1102 to 1104 in the image converting job of FIG. 11 can be adapted with an existing technique, they are not detailed here.

If MFP which scans the image is the MFP-B 407, the format of read image data at the MFP-B 407 is monochrome binary of resolution 600 dpi, resolution converting process at 1103 is unnecessary. Therefore, each MFP which is requested of the image conversion simply uses only modules for performing converting process from binary to multilevel at 1102 and profile converting process from Gray to L at 1104.

If MFP which scans the image is the MFP-C 407, the format of read image data at the MFP-B 407 is color RGB 8 bit of resolution 600 dpi. Therefore, only modules for performing profile converting process from RGB to Lab at 1104 need to be used.

Figure 12:
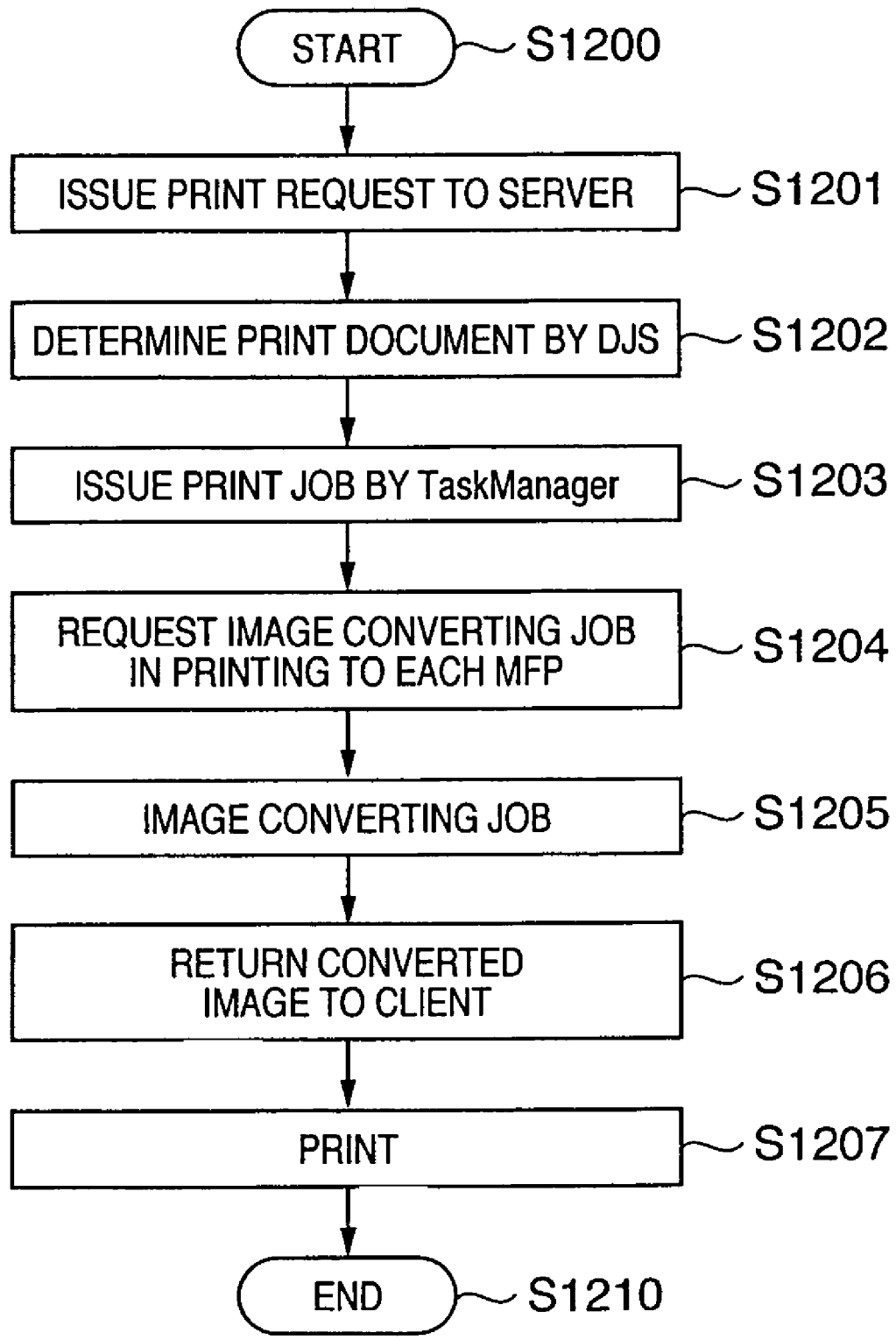
FIG. 12 is a diagram showing a flowchart of process where document data stored in a distributed shared document storage area is printed.

FIG. 12 shows an exemplary flowchart of process where document data stored in a distributed shared document storage area is printed. Here, a case where a user instructs as such with a print button at an MFP will be described.

When a print button 903 is pressed down, the process starts at S1200. At S1201, a print request is issued to the grid server 402 from the MFP (client) on which the user operates.

The DJS determines HDD resources of the MFP which stores a document to be printed which is specified at S1202, and creates an image converting job for MFP which is instructed to print. Then, the DJS examines empty resources of a CPU of each MFP, divides the job, schedules as required, and requests TM to issue a print job.

At S1203, the TM issues the print job in response to a request from the DJS. At S1204, the TM requests the MFP which performs an image converting job at printing to perform the job.

At S1205, the MFP which receives the request performs the image converting job and returns the converted result to the server 402. At the server 402, converted image data received from all the MFPs which is requested to perform the job are merged as required and returned to the MFP which is instructed to print.

The MFP which received the image performs printing according to a reprinting processing flow of a conventional stored document as mentioned above at S1207 and terminates the process.

As stored document data is image data of a common format in this embodiment and not in the format printable at the MFP which instructed to print, the image converting process is also performed in printing process.

Figure 13:
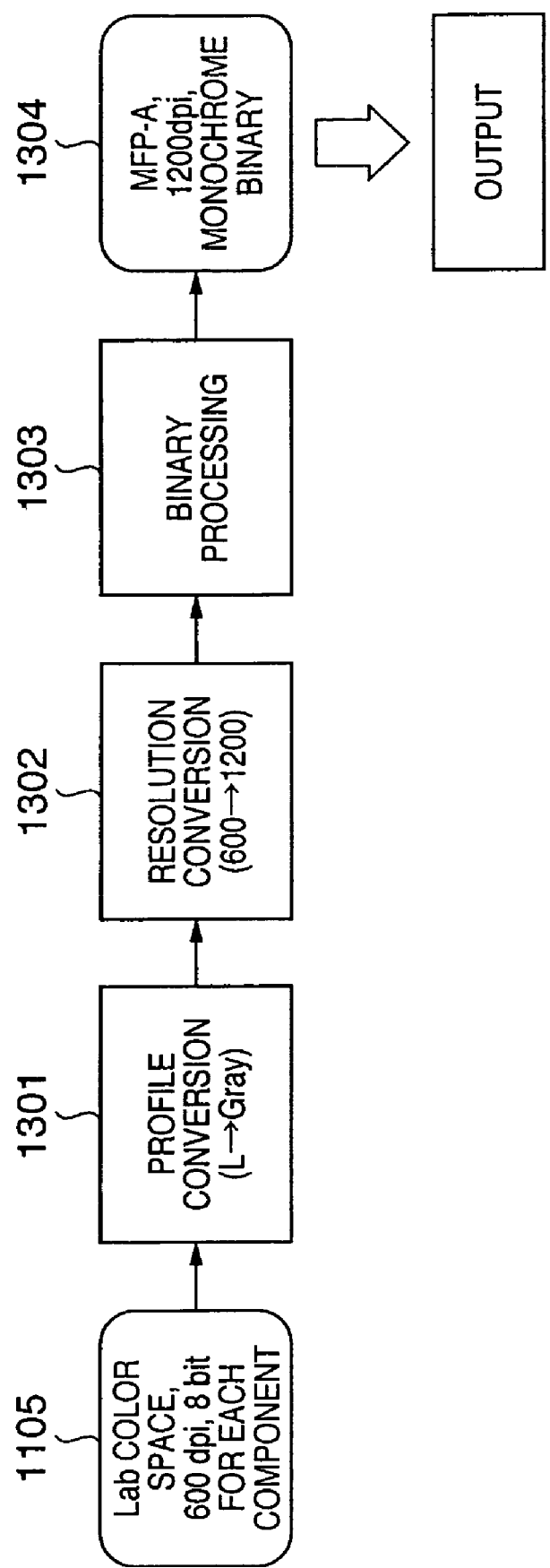
FIG. 13 is a diagram showing a processing flow when stored document data is printed at the MFP-A.

FIG. 13 is a diagram showing a processing flow when stored document data is printed at the MFP-A 403.

The document data 1105 is stored as image data in a common format mentioned above (Lab color space, 8 bit for each component, resolution 600 dpi). The image data of Lab color space is converted into the image data of Gray by a profile converting process 1301. The converted image data is converted from 600 dpi to 1200 dpi by a resolution converting process 1302, which is further converted into image data 1304 corresponding to the format of MFP-A 403 by a binary processing 1303 and outputted. That is to say, converting process converse to that performed at being stored is performed in printing and outputted.

When printing is performed at the other MFPs, i.e., MFP-B 407 or MFP-C 411, converting process converse to that performed in storing a document as mentioned above may be also performed and outputted.

According to this embodiment, only image data in a common format is stored in the distributed shared document storage area which can be accessed from each device in the grid computing system. Therefore, various formats of image data are not mixed in the distributed shared document storage area. CPU resources in the grid computing system can speed up the mutual image converting process between image data in a common format and image data complying with specifications of each MFP.

Although components of the grid computing system are assumed to be a single server PC and three MFPs in the embodiment mentioned above, they do not limit the type and the number of devices to form the grid computing system. For example, components of the grid computing system may include a plurality of PCs to speed up the process. Further, the grid computing system may include an HDD with a big capacity to enlarge the storage area.

Although the embodiment mentioned above is described with an example of a case where printing is performed as reusing stored document data, the above-described grid computing can also be applied to send document data. In such a case, the present invention only needs to execute the format converting section 205 or 217 of FIG. 2 on image data subjected to image converting processing and send the image data via a network. In addition, the above-described grid computing can also be applied when image data spooled in a printing function is stored. In such a case, a user only needs to convert the image data into that in the common format by performing similar image converting processing and store the image data.

The specifications of each MFP in this embodiment are merely examples and the present invention can also be applied to MFPs in the specifications other than that mentioned above. For example, the present invention can also be applied to an image of data of N value (N>2) which is half toned as specifications of monochrome MFP. In such a case, the present invention only needs to change conversion processing from binary to multilevel, perform conversion from N values to multilevel, and perform transformation to N values instead of transformation to binary.

As mentioned above, if image processing apparatuses with different specifications are mixed in a system, a format of image data stored in a storage area shared in the system is made as a desired format in the embodiment. Therefore, even when image data is reused for printing or the like, the image data can be printed in the same quality from each image processing apparatus.

Second Embodiment

The second embodiment of the present invention will be described below. The second embodiment is the same grid computing system as the first embodiment. Description of the same parts as that of the first embodiment mentioned above will be omitted and the parts characteristic to the second embodiment will be mainly described below.

The first embodiment stores image data which is converted into a common format in the distributed shared document storage area and the format of the image data is converted into another format according to specifications of the device which will print the image data when printing is executed. The second embodiment previously converts the format of the image data into another format according to specifications of each MFP and stores document data of a plurality of formats.

Figure 14:
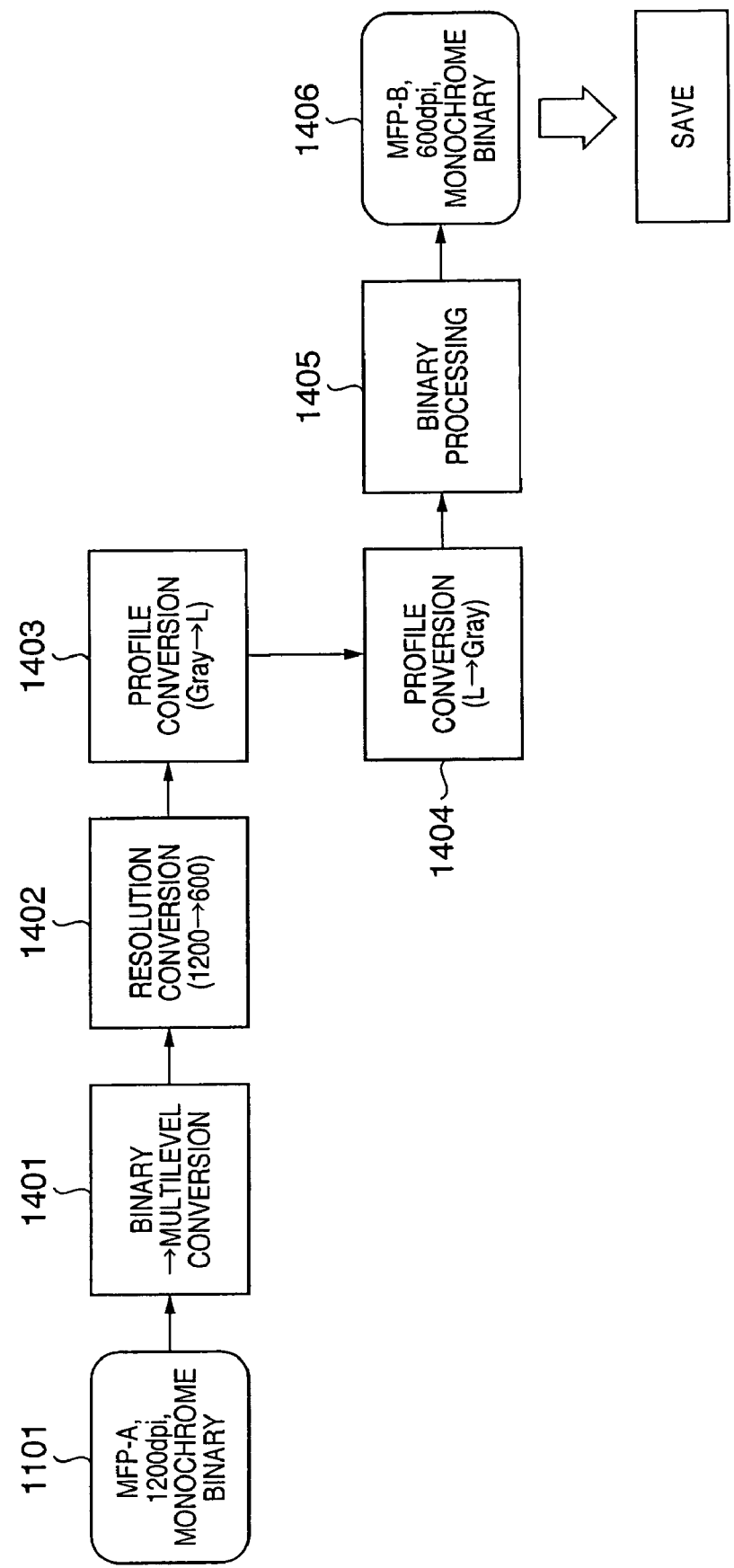
FIG. 14 is a diagram showing a flow of image conversion processing when image data scanned by the MFP-A in the second embodiment is stored.

FIG. 14 shows a flow of image conversion processing when image data scanned by the MFP-A 403 in the embodiment is stored.

This example shows conversion processing from image data read by the MFP-A 403 to image data appropriate for the MFP-B 407. The image data read by the MFP-A 403 is monochrome binary and resolution of 1200 dpi as shown in 1101. This embodiment converts from binary to multilevel at 1401 and converts resolution to 600 dpi at 1402 on the image data of that format. Then, this embodiment performs profile conversion from Gray to L at 1403 and profile conversion from L to Gray at 1404, and performs transformation to binary at 1405 and stores the image data as an image data of monochrome binary and resolution of 600 dpi according to specifications of MFP-B 407 at 1406. Here, the embodiment converts from Gray to Gray by performing conversion from Gray to L and from L to Gray with two profile conversions at 1403 and 1404.

As such, this embodiment performs image conversion (FIG. 11) which is performed in storing in the first embodiment and image conversion (FIG. 13) which is performed in printing collectively in storing.

This embodiment creates image data according to specifications of MFP-C 411 in the same manner, and stores all of the tree types of image data in a distributed processing document storage area:

(1) image data read and obtained by an MFP-A, (2) image data read by an MFP-A and converted for an MFP-B, and (3) image data read by an MFP-A and converted for an MFP-C.

The image data (1) is stored in the storage area as a main image and image data (2) and (3) are linked as semi images and stored. In order to designate a document to be printed the image data (1) is designated, and semi images may be printed returning the link according to the type of the MFP to print the image.

When this embodiment stores read image data in such a manner, it stores image data in a format according to each MFP. The embodiment can print image data without performing particular image conversion processing as in the case where it prints a document usually stored in the MFP. With this configuration, this embodiment can reprint faster than the first embodiment.

With the configuration of this embodiment, memory capacity required for storing image data is bigger than in the first embodiment. This embodiment, however, may convert main image data into image data in a common format such as that in the first embodiment and store only the image data in a common format and compress capacity of image data to store, according to a user's instruction or automatically in response to detecting the lack of free capacity.

This embodiment may store image data in a common format in addition to image data for each MFP in storing read image data, and only store image data in a common format according to a user's instruction or automatically in response to detecting the lack of free capacity. In this case, the image data for each MFP is deleted.

Third Embodiment

The third embodiment of the present invention will be described below. The third embodiment is the same grid computing system as the first and the second embodiments. Description of the same parts as that of the first and the second embodiments mentioned above will be omitted and the parts characteristic to the third embodiment will be mainly described below.

In the first and second embodiments mentioned above, the server PC 401 functions as a TM and a DJS in the grid computing system, and image converting processing is performed or image data is stored by any of the MFPs. In the third embodiment, the server PC 1501 is assumed to have an HDD with a large capacity and a high-speed CPU, as FIG. 15.

Figure 15:
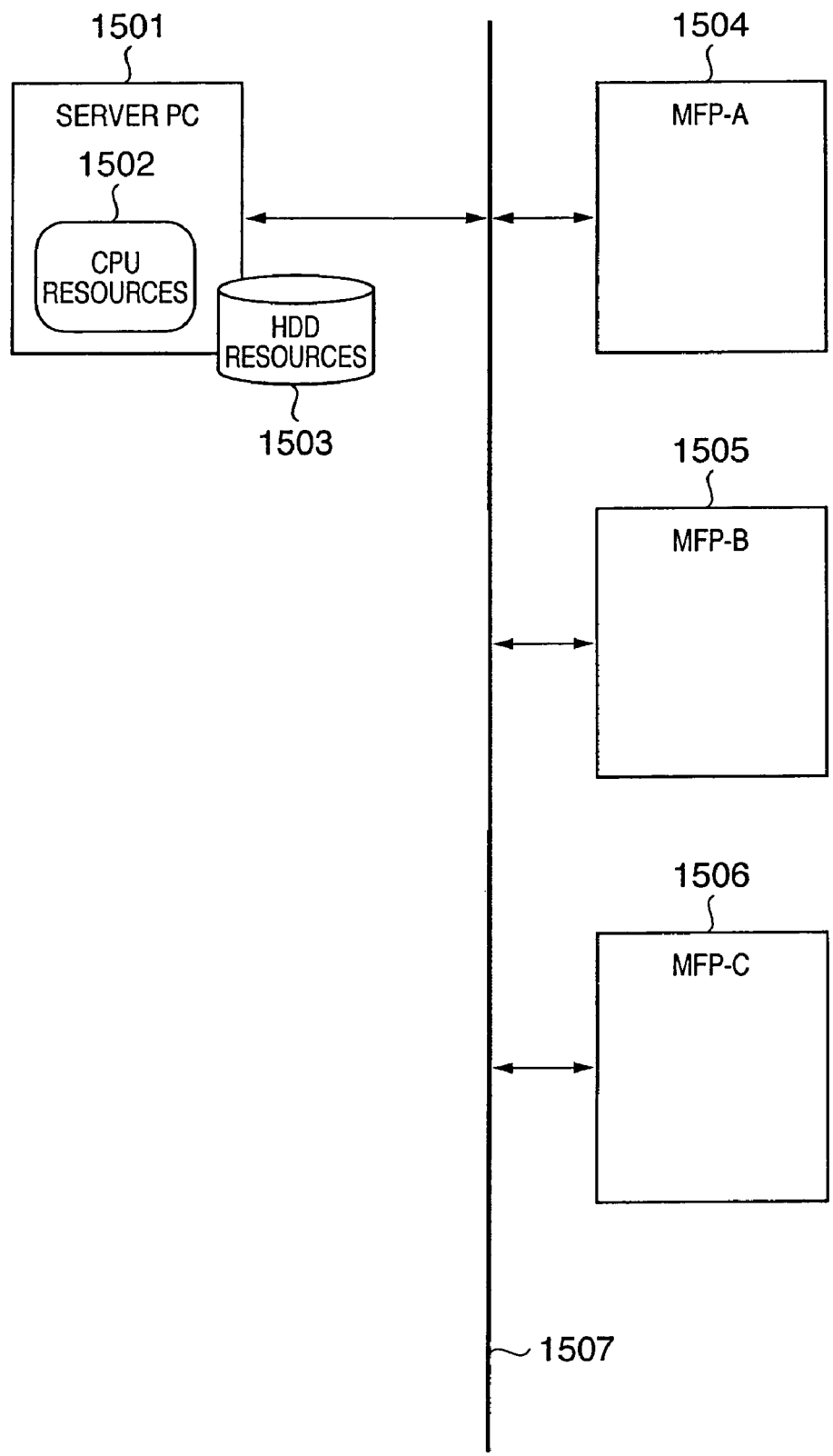
FIG. 15 is a block diagram showing an outlined configuration of the grid computing system of the third embodiment.

FIG. 15 is a block diagram showing an outlined configuration of the grid computing system of the third embodiment. A server PC 1501 of this embodiment has an HDD 1503 with a large capacity and a high-speed CPU 1502. An MFP-A 1504, an MFP-B 1505 and an MFP-C 1506 are connected with the server PC 1501 via a network 1507. Although each of the three MFPs also has an HDD (or memory) and a CPU, they are not used as resources of the grid computing system.

Therefore, this embodiment performs image converting processing to image data in a common format or for each MFP as mentioned above by using CPU resources 1502 and stores obtained image data into the HDD 1503. In such a case, usually, the CPU resources 1502 of the server PC 1501 are preferentially used. When the CPU resources 1502 is temporally loaded too much, a CPU of another MFP may be used as resources.

According to the configuration of this embodiment, load distribution to each MFP is reduced so that resources of each MFP can be used more effectively than in the first or the second embodiment.

Other Embodiments

The present invention may be applied to the grid computing system consisting of a plurality of devices (a grid computing network) or applied to a device forming the grid computing network.

The present invention also includes a case where software programs for realizing functions of the embodiments mentioned above (in this embodiment, programs corresponding to a flowchart shown in FIG. 6, 10 or 12 and a processing flow shown in FIG. 11, 13 or 14) are directly or remotely supplied to a system or an apparatus, which reads and executes the supplied program code. In such a case, if only the embodiment has a function of a program, the embodiment needs not to be a program.

Therefore, to realize the function processing of the present invention in a computer, the program code to be installed in the computer also realizes the present invention. That is to say, a computer program for realizing the function processing of the present invention is also included in the claims of the present invention.

In such a case, any embodiment of an object code, a program executed by an interpreter or a script data to be supplied to an OS or the like may be used if only the embodiment has a program function.

Recording media for supplying a program include a flexible disk, a hard disk, an optical disk, a magneto-optical disk, an MO, CD-ROM, CD-R, CD-RW, a magnetic tape, a non-volatile memory card, ROM, and a DVD (DVD-ROM, DVD-R).

As a method of supplying a program, the present invention may supply a program by being connected to a homepage on the Internet using a browser of the client computer and downloading a computer program of the present invention or a file including a compressed automatic installing function from the homepage to a recording medium such as a hard disk. Alternatively, the present invention can be realized when a program code forming a program of the present invention is divided into files and respective files are downloaded from different home pages. A WWW server for letting a plurality of users to download a program file for causing a computer to realize function processing of the present invention is also included in a range of the present invention.

The program of the present invention can be encrypted and distributed to users on recording media such as CD-ROM, and a user who fulfilled predetermined conditions may be allowed to download key information for decrypting the encryption from a homepage via the Internet and execute the encrypted program by using the key information for installing the program in the computer.

The functions of embodiments mentioned above can be realized when a computer executes a read program. Based on the instruction of the program, an OS or the like operating on a computer can perform a part or all of the actual processing and the functions of the embodiments mentioned above can be realized by the processing.

The program read from a recording medium is written in an add-in board inserted in a computer or a computer or on memory in an add-in unit connected with a computer. Thereafter, based on an instruction of the program, a CPU or the like in the add-in board or the add-in unit performs a part or all of the actual processing so that the processing realizes the functions of the embodiments mentioned above.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-106789, filed Apr. 1, 2005 which is hereby incorporated by reference herein in its entirety.

What is claimed is:

1. An information processing system connectable to an image processing apparatus, comprising:

a plurality of processing modules; and a management module, wherein said management module receives image data read by an image scanner equipped in the image processing apparatus, and then divides the received image data, each of the plurality of processing modules executes distributed image conversion processing of a format of each divided image data divided by said management module into a predetermined format using profile information of said image processing apparatus, and said information processing system stores the image data into a storage unit, the image data having been converted into the predetermined format by the distributed image conversion processing which was executed by the plurality of processing modules, and wherein said system is further connectable to an other image processing apparatus other than said image processing apparatus, and when an instruction is made at the other image processing apparatus for printing the stored image data, said plurality of processing modules execute conversion processing of the stored image data having been converted into the predetermined format into a format conforming to a specification of said other image processing apparatus at which the instruction was made using profile information of said other image processing apparatus, and then cause said other image processing apparatus to print the image data converted into the format conforming to the specification of said other image processing apparatus, and wherein, when said management module receives monochrome image data scanned by the scanners of said image processing apparatus, said plurality of processing modules convert image data divided by said management module into multilevel image data, convert a resolution of the multilevel image data into a predetermined resolution, perform a profile conversion of a color space of the multilevel image data of which the resolution has been converted into the L*a*b* color space independent of an image processing apparatus using the profile information of said image processing apparatus, store the image data of which color space has been converted, and when a print instruction to print the stored image in monochrome is made, said plurality of processing modules convert the stored image data of a color space into image data of gray depending on the image processing apparatus at which the print instruction was made using the profile information of the image processing apparatus at which the print instruction was made, convert a resolution of the converted image data of gray into a resolution in accordance with the image processing apparatus at which the print instruction was made, and convert the image data of gray whose resolution is converted into binary image data.

2. The system according to claim 1, further comprising calculation means for calculating profile information of each image processing apparatus connected with said system based on image data of an original on which a predetermined pattern is printed and read by a scanner of each image processing apparatus.

3. The system according to claim 1, wherein the profile information of said information processing apparatus includes at least any of said scanner's reading resolution, printing resolution of a printer equipped in the image processing apparatus, information of whether it is monochrome or color, and information on a color space to be used.

4. A method performed by an information processing system connectable to an image processing apparatus, said method comprising the steps of:
  receiving image data read by an image scanner equipped in the image processing apparatus, and dividing the received image data;
  executing distributed image conversion processing of a format of each divided image data divided by said management module into a predetermined format using profile information of said image processing apparatus; and
  storing the image data into a storage unit, the image data having been converted into the predetermined format by the distributed image conversion processing which was executed by the plurality of processing modules,
  wherein, said system is further connectable to an other image processing apparatus other than said image processing apparatus, and said method further comprises a step of, when an instruction is made at the other image processing apparatus for printing the stored image data, executing conversion processing of the stored image data having been converted into the predetermined format into a format conforming to a specification of said other image processing apparatus at which the instruction was made using profile information of said other image processing apparatus, and causing said other image processing apparatus to print the image data converted into the format conforming to the specification of said other image processing apparatus, and
  wherein, said converting step, when receiving monochrome image data scanned by the scanners of said image processing apparatus, further comprises:
  converting image data divided by said management module into multilevel image data;
  converting a resolution of the multilevel image data into a predetermined resolution;
  performing a profile conversion of a color space of the multilevel image data of which the resolution has been converted into the L*a*b* color space independent of an image processing apparatus using the profile information of said image processing apparatus; and
  storing the image data of which color space has been converted, and
  when a print instruction to print the stored image in monochrome is made, said converting step further comprises:
  converting the stored image data of a color space into image data of gray depending on the image processing apparatus at which the print instruction was made using the profile information of the image processing apparatus at which the print instruction was made;
  converting a resolution of the converted image data of gray into a resolution in accordance with the image processing apparatus at which the print instruction was made; and
  converting the image data of gray whose resolution is converted into binary image data.

5. The method according to claim 4, further comprising a step of calculating profile information of each image processing apparatus connected with the system based on image data of an original on which a predetermined pattern is printed read by a scanner of each image processing apparatus.

6. The method according to claim 4, wherein the profile information of said information processing apparatus includes at least any of said scanner's reading resolution, printing resolution of a printer equipped in the image processing apparatus, information of whether it is monochrome or color, and information on a color space to be used.

7. A computer-readable storage medium storing a program thereon for causing an information processing system connectable to an image processing apparatus to execute a method, said method comprising the steps of:
  receiving image data read by an image scanner equipped in the image processing apparatus, and dividing the received image data;
  executing distributed image conversion processing of a format of each divided image data divided by said management module into a predetermined format using profile information of said image processing apparatus; and
  storing the image data into a storage unit, the image data having been converted into the predetermined format by the distributed image conversion processing which was executed by the plurality of processing modules;
  wherein, said system is further connectable to an other image processing apparatus other than said image processing apparatus, and said method further comprises a step of, when an instruction is made at the other image processing apparatus for printing the stored image data, executing conversion processing of the stored image data having been converted into the predetermined format into a format conforming to a specification of said other image processing apparatus at which the instruction was made using the profile information of said other image processing apparatus, and causing said other image processing apparatus to print the image data converted into the format conforming to the specification of said other image processing apparatus;
  when receiving monochrome image data scanned by the scanners of said image processing apparatus, said converting step further comprises:
  converting image data divided by said management module into multilevel image data;
  converting a resolution of the multilevel image data into a predetermined resolution;
  performing a profile conversion of a color space of the multilevel image data of which the resolution has been converted into the L*a*b* color space independent of an image processing apparatus using profile information of said image processing apparatus; and
  storing the image data of which color space has been converted, and
  when a print instruction to print the stored image in monochrome is made, said converting step further comprises:
  converting the stored image data of a color space into image data of gray depend on the image processing apparatus at which the print instruction was made using the profile information of the image processing apparatus at which the print instruction was made;
  converting a resolution of the converted image data of gray into a resolution in accordance with the image processing apparatus at which the print instruction was made; and
  converting the image data of gray whose resolution is converted into binary image data.

8. The computer-readable storage medium according to claim 7, wherein said method further comprises a step of calculating profile information of each image processing apparatus connected with the system based on image data of an original on which a predetermined pattern is printed read by a scanner of each image processing apparatus.

9. The computer-readable storage medium according to claim 7, wherein the profile information of said information processing apparatus includes at least any of said scanner's reading resolution, printing resolution of a printer equipped in the image processing apparatus, information of whether it is monochrome or color, and information on a color space to be used.

* * * * *